April 9, 1935.   F. HAUSER   1,996,920
REVOLVING NOSE PIECE FOR MICROSCOPES
Filed Sept. 11, 1933
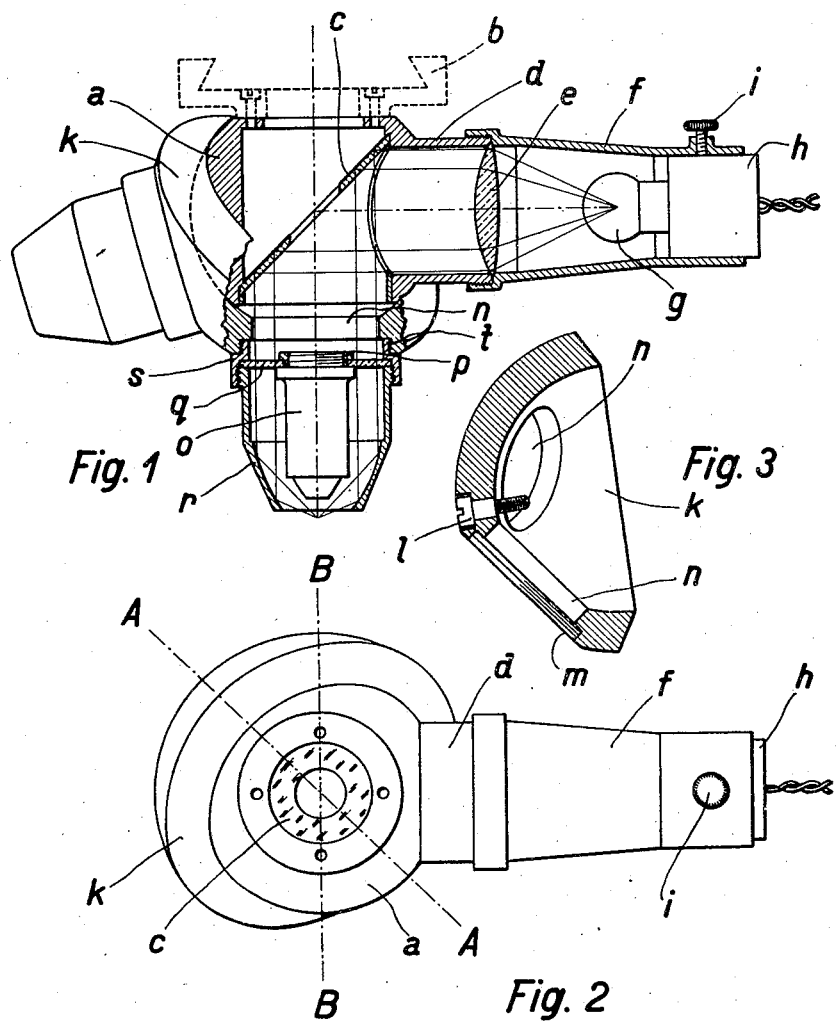
Inventor:
Friedrich Hauser Patented Apr. 9, 1935

1,996,920

UNITED STATES PATENT OFFICE 1,996,920

REVOLVING NOSE-PIECE FOR MICROSCOPES

Friedrich Hauser, Jena, Germany, assignor to firm Carl Zeiss, Jena, Germany

Application September 11, 1933, Serial No. 688,960
In Germany September 14, 1932

2 Claims. (Cl. 88—39)

The present invention relates to revolving nose-pieces for microscopes, which are to be used in observations with incident light. Observations of this kind may be effected either by means of objectives which, themselves, form part of the illumination system or which are connected to condensers surrounding the objectives in a ring-like manner, a so-called light-field illumination being obtained in the former and a dark-field illumination in the latter case. On account of the comparatively great diameter of dark-field systems consisting of a condenser and an objective, only one system of the said kind has been attached to the tube, and when another magnification is required it is generally necessary to remove the one compound system and to attach another such system. To overcome this inconvenience is the object of the invention.

The invention provides a revolving nose-piece which may receive condensers that surround the objectives in a ring-like manner. The light is directed to the condensers in the known way from one side by means of a lateral source of light and a reflecting system which is inclined relatively to the optical axis of the objective. From reasons not far to seek, the idea will suggest itself to dispose this reflecting system between the microscope tube and the revolving nose-piece. This construction however, is not very advantageous in that the tube length for the observation is increased and the pencil of illumination rays is to cover a comparatively long distance between the reflecting system and the condenser, it being therefore more convenient to place the inclined reflecting system inside the socket to which the revolving part of the nose-piece is attached.

As a rule, the usual revolving nose-pieces are so attached to the microscope stand that their axis of rotation coincides with the axis of symmetry of the microscope stand. The lateral supply of light to the reflecting system in the socket for the nose-piece requires however a different attachment of the nose-piece to the microscope stand. With the great majority of microscopes it is not possible in this case to give the axis of rotation such an otherwise self-evident position relative to the ray entrance aperture that it lies in the plane at right angles to the plane of symmetry of the microscope stand, the impracticability of this construction being due to the fact that the revolving nose-piece and the compound dark-field systems require too much space and cannot be turned freely because one part or another of the microscope stand, for instance the guide for the focusing movements of the microscope tube, would be in their way. To overcome the said difficulty, the axis of rotation of the nose-piece is made to lie in a plane inclined at approximately 45° relatively to the plane of symmetry of the microscope stand, which means that the illumination device may be disposed at one side of the microscope tube, that is to say in a plane approximately at right angles to the said plane of symmetry.

The accompanying drawing, which illustrates the invention, represents a constructional example of a revolving nose-piece for three compound dark-field systems. Figure 1 shows the revolving nose-piece with the dark-field systems and the illumination device in elevation, partly in section. Figure 2 represents the revolving nose-piece in plan view, and Figure 3 shows the rotatable part of the nose-piece in a section through line A—A in Figure 2.

The revolving nose-piece has a spherical socket $a$ which may be given the prescribed position in and attached to the microscope tube in any desired manner. To this purpose, the socket $a$ of the example represented in the drawing (Figure 1) is screwed to a slide $b$. The microscope tube is to be provided with a corresponding slide guide in such a manner that the plane of symmetry of the microscope stand assumes the position represented by the line B—B in Figure 2. The axis of the illumination device lies in a plane at right angles to the said plane of symmetry. The socket $a$ is cylindrically bored and contains a plane annular mirror $c$ which is inclined at 45° to the axis of the bore. Opposite the reflecting surface of this mirror $c$, a lateral tube $d$ is fixed to the socket $a$. In the other end of the tube $d$ is mounted a converging lens $e$, and this other end is screwed into a lamp housing $f$ containing a glow-lamp $g$ whose holder $h$ is kept in correct position by means of a clamping screw $i$.

The revolving part of the nose-piece is a hemi-spherical bowl $k$. The axle about which this part rotates is a screw $l$ whose axis lies in a plane determined by the line A—A and a line at right angles to the plane in which Figure 2 is represented in the drawing. Accordingly, the plane containing the axis of the screw $l$ is inclined at 45° relatively to the symmetry plane B—B of the microscope stand as well as to the axis of the illumination device. The hemi-spherical bowl $k$ contains three apertures $n$ having female threads $m$, one compound dark-field system being screwed into each aperture. These dark-field systems consist of a microscope objective $o$, which is screwed by means of a nut $p$ to a bored plano-parallel glass plate $q$, and a condenser $r$, which surrounds the objective $o$ in a ring-like manner and is so screwed into a ring $s$ as to support the glass plate $q$. The ring $s$ has a male thread $t$ by means of which the system is attached to the revolving part $k$ of the nose-piece.

When using the device, the slide $b$ is placed on the slide-guide on the microscope tube, and the glow-lamp $g$ is connected up. By means of the screw $i$, the holder $h$ of the glow-lamp $g$ is clamped in the lamp housing $f$ in such a position that the focus of the lens $e$ lies in the incandescent filament, as a consequence of which the illumination rays refracted by the lens $e$ are approximately parallel to each other. The reflector $c$ deflects these illumination rays downwardly at right angles. Subsequently to having traversed the glass plate $q$, the said rays are combined by the condenser $r$ at a point in the focusing plane of the microscope objective $o$. When a different microscopic magnification is required, the hemi-spherical bowl $k$ is rotated about the screw $l$ until the desired dark-field system takes the place of the one represented in section in Figure 1. The images produced by the objectives $o$ are observed through the bore in the mirror $c$.

I claim:

1. A revolving nose-piece for microscopes, comprising a part adapted to be attached to a microscope tube and another part rotatably mounted on the first said part, this other part being adapted to receive a plurality of condensers, each of the condensers being adapted to surround an objective, the nose-piece having further a reflecting system disposed in the first said part and adapted to direct light emanating from one side to the condenser.

2. A revolving nose-piece for microscopes, comprising a part adapted to be attached to a microscope tube and another part rotatably mounted on the first said part, this other part being adapted to receive a plurality of condensers, each of the condensers being adapted to surround an objective, the nose-piece having further a reflecting system disposed in the first said part and adapted to direct light emanating from one side to the condenser, the axis of rotation of the said other part lying in a plane inclined at approximately 45° relatively to the plane in which the said reflecting system deflects the light emanating from one side.

FRIEDRICH HAUSER.